United States Patent
Li et al.

(10) Patent No.: US 11,425,108 B2
(45) Date of Patent: *Aug. 23, 2022

(54) BLOCKCHAIN-BASED SERVICE DATA ENCRYPTION METHODS AND APPARATUSES

(71) Applicant: Advanced New Technologies Co., Ltd., Grand Cayman (KY)

(72) Inventors: Shubo Li, Hangzhou (CN); Yixiang Zhang, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 17/405,689

(22) Filed: Aug. 18, 2021

(65) Prior Publication Data
US 2021/0385200 A1  Dec. 9, 2021

Related U.S. Application Data

(63) Continuation of application No. 17/161,836, filed on Jan. 29, 2021, now Pat. No. 11,102,185, which is a
(Continued)

(30) Foreign Application Priority Data

Nov. 12, 2018 (CN) .......................... 201811338344.8

(51) Int. Cl.
*H04L 9/40* (2022.01)
*H04L 9/08* (2006.01)

(52) U.S. Cl.
CPC ........ *H04L 63/0442* (2013.01); *H04L 9/0819* (2013.01); *H04L 9/0861* (2013.01);
(Continued)

(58) Field of Classification Search
CPC . H04L 63/0442; H04L 63/123; H04L 9/0894; H04L 9/0861; H04L 9/0819; H04L 2209/38
See application file for complete search history.

(56) References Cited

U.S. PATENT DOCUMENTS 10,044,503 B1    8/2018  Roth et al.
10,824,746 B1 * 11/2020  Magerkurth ........ H04L 63/0442
(Continued)

FOREIGN PATENT DOCUMENTS

CN    105681301    6/2016
CN    106055993    10/2016
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Henry Tsang
(74) *Attorney, Agent, or Firm* — Fish & Richardson P.C.

(57) ABSTRACT

Blockchain-based service data encryption methods and apparatuses are provided wherein by a first derived key is obtained by a node device of a key receiver, the first derived key distributed by a node device of a key distributor, wherein the first derived key is derived from a derived key of the key distributor based on a service data permission type of the key receiver and service data is encrypted based on the first derived key to obtain encrypted service data. The encrypted service data is sent to a blockchain, so that the encrypted service data is recorded in a distributed database of the blockchain after the blockchain performs consensus verification on the encrypted service. Because the derived key of the key distributor can decrypt the service data encrypted by the first derived key, the key distributor can
(Continued)

decrypt, monitor, and manage service data uploaded by the key receiver.

16 Claims, 4 Drawing Sheets

Related U.S. Application Data continuation of application No. PCT/CN2019/106017, filed on Sep. 16, 2019.

(52) U.S. Cl.
CPC .......... *H04L 9/0894* (2013.01); *H04L 63/123* (2013.01); *H04L 2209/38* (2013.01)

(56) References Cited

U.S. PATENT DOCUMENTS

| | | | |
|---|---|---|---|
| 2012/0144210 | A1 | 6/2012 | Yacobi |
| 2017/0244679 | A1* | 8/2017 | Kumar .................. H04L 63/06 |
| 2018/0097638 | A1* | 4/2018 | Haldenby .......... G06K 9/00201 |
| 2018/0343114 | A1* | 11/2018 | Ben-Ari ................ H04L 9/3239 |
| 2019/0149325 | A1* | 5/2019 | Garagiola ............. H04L 9/3263 |
| | | | 380/278 |
| 2020/0322137 | A1* | 10/2020 | Arumugam ........... H04L 9/3247 |

FOREIGN PATENT DOCUMENTS

| | | |
|---|---|---|
| CN | 108667605 | 10/2016 |
| CN | 107103472 | 8/2017 |
| CN | 107666387 | 2/2018 |
| CN | 108229962 | 6/2018 |
| CN | 108768633 | 11/2018 |
| CN | 108768663 | 11/2018 |
| CN | 110033258 | 7/2019 |

OTHER PUBLICATIONS

Nakamoto, "Bitcoin: A Peer-to-Peer Electronic Cash System," www.bitcoin.org, 2005, 9 pages.

PCT International Preliminary Report on Patentability in International Application No. PCT/CN2019/106017, dated May 11, 2021, 10 pages (with English translation).

PCT International Search Report and Written Opinion in International Application No. PCT/CN2019/106017, dated Nov. 28, 2019, 10 pages (with partial English translation).

Extended European Search Report in European Application No. 19883954.0, dated Nov. 8, 2021, 7 pages.

\* cited by examiner

BLOCKCHAIN-BASED SERVICE DATA ENCRYPTION METHODS AND APPARATUSES

CROSS-REFERENCE TO RELATED APPLICATIONS

This application is a continuation of U.S. patent application Ser. No. 17/161,836, now allowed, filed on Jan. 29, 2021, which is a continuation of PCT Application No. PCT/CN2019/106017, filed on Sep. 16, 2019, which claims priority to Chinese Patent Application No. 201811338344.8, filed on Nov. 12, 2018, and each application is hereby incorporated by reference in its entirety.

TECHNICAL FIELD

One or more embodiments of the present specification relate to the field of blockchain technologies, and in particular, to blockchain-based service data encryption methods and apparatuses.

BACKGROUND

Blockchain technology, also referred to as the distributed ledger technology, is an emerging technology that several computing devices participate in "bookkeeping" to jointly maintain a complete distributed database. Blockchain technology has features of decentralization and transparency, each computing device can participate in database recording, and data can be quickly synchronized between the computing devices, so that blockchain technology has been widely used in many fields. A blockchain ledger is distributed to all member nodes in a network, and a history record of service data occurring in the network is permanently recorded in a block. Because the ledger is public, the blockchain ledger has no privacy protection function, and privacy of the service data needs to be protected by using an additional technology.

SUMMARY

In view of this, one or more embodiments of the present specification provide blockchain-based service data encryption methods and apparatuses.

To achieve the previous objective, one or more implementations of the present specification provide the following technical solutions:

According to a first aspect of one or more embodiments of the present specification, a blockchain-based service data encryption method is provided and applied to a blockchain including a node device of a key distributor and a node device of a key receiver. The method includes the following: the node device of the key receiver obtains a first derived key distributed by the node device of the key distributor, where the first derived key is derived from a derived key of the key distributor based on a service data permission type of the key receiver, and the derived key can decrypt service data encrypted by the first derived key; service data is encrypted based on the first derived key to obtain encrypted service data; and the encrypted service data is sent to the blockchain, so that the encrypted service data is recorded in a distributed database of the blockchain after the blockchain performs consensus verification on the encrypted service data.

According to a second aspect of one or more embodiments of the present specification, a blockchain-based service data encryption apparatus is provided and applied to a blockchain including a node device of a key distributor and a node device of a key receiver. The apparatus includes: an obtaining unit, configured to obtain, by the node device of the key receiver, a first derived key distributed by the node device of the key distributor, where the first derived key is derived from a derived key of the key distributor based on a service data permission type of the key receiver, and the derived key can decrypt service data encrypted by the first derived key; an encryption unit, configured to encrypt service data based on the first derived key to obtain encrypted service data; and a sending unit, configured to send the encrypted service data to the blockchain, so that the encrypted service data is recorded in a distributed database of the blockchain after the blockchain performs consensus verification on the encrypted service data.

According to a third aspect of one or more embodiments of the present specification, a computer device is provided, including a memory and a processor. The memory stores a computer program that can be run by the processor, and the process performs the blockchain-based service data encryption method when running the computer program.

In the blockchain-based service data encryption methods and apparatuses provided in the present specification, the first derived key used to encrypt the service data is derived from the derived key of the key distributor based on the service data permission type of the key receiver. Because the derived key of the key distributor can decrypt the service data encrypted by the first derived key, the key distributor can decrypt, monitor, and manage service data uploaded by the key receiver. Service data permission types of a plurality of key receivers are different, and first derived keys obtained by the plurality of key receivers to encrypt the service data can also be different. Therefore, data privacy of the service data encrypted based on the different first derived keys can be isolated between the key receivers of different service data permission types.

DESCRIPTION OF IMPLEMENTATIONS

Example embodiments are described in detail here, and examples of the example embodiments are presented in the accompanying drawings. When the following description relates to the accompanying drawings, unless specified otherwise, same numbers in different accompanying drawings represent same or similar elements. Implementations described in the following example embodiments do not represent all implementations consistent with one or more embodiments of the present specification. On the contrary, the implementations are only examples of apparatus and methods that are described in the appended claims in detail and consistent with some aspects of one or more embodiments of the present specification.

It is worthwhile to note that steps of a corresponding method are not necessarily performed in a sequence shown and described in the present specification in another embodiment. In some other embodiments, the method can include steps more or less than those described in the present specification. In addition, a single step described in the present specification may be divided into a plurality of steps in another embodiment for description. However, the plurality of steps described in the present specification may be combined into a single step for description in another embodiment.

Figure 1:
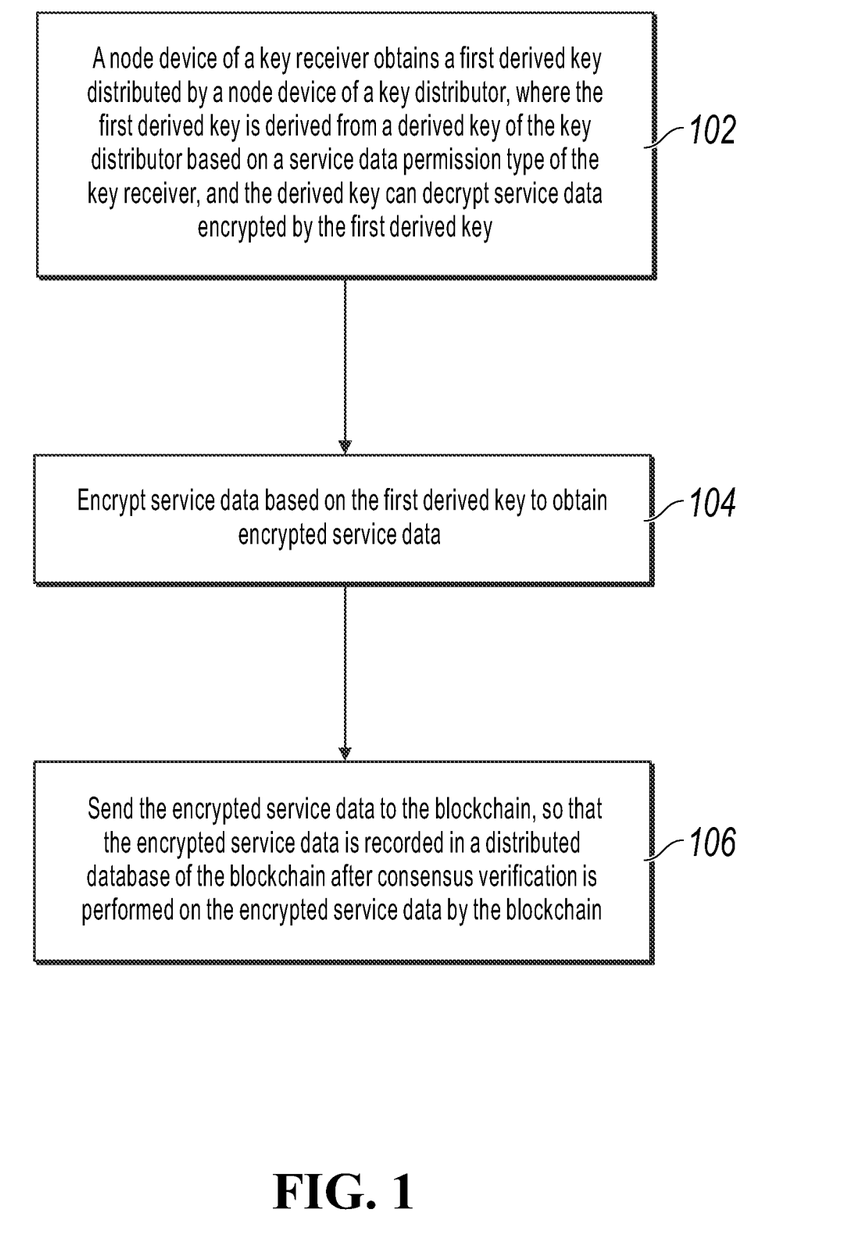
FIG. 1 is a flowchart illustrating a blockchain-based service data encryption method, according to an example embodiment.

FIG. 1 is a blockchain-based service data encryption method, applied to a blockchain including a node device of a key distributor and a node device of a key receiver.

The blockchain described in the previous embodiment can be a (Peer to Peer) P2P network system that has a distributed data storage structure and that is formed by each node device by using a consensus algorithm. Data in the blockchain is maintained in a temporally connected "blocks". A subsequent block includes a data digest of a preceding block, and all data of all or some of the nodes are backed up based on a specific consensus algorithm (such as Proof of Work, Proof of Stake, Delegated Proof of Stake, or Practical Byzantine Fault Tolerance). A person skilled in the art knows that because a blockchain system runs under a corresponding consensus algorithm, data recorded in a blockchain database is difficult to be tampered with by any node. For example, a blockchain using PoW consensus needs at least 51% computing power of a network-wide attack to tamper with existing data. Therefore, the blockchain system has features that another centralized database system cannot achieve: data security assurance, and attack and tampering prevention.

The node device of the key distributor and the node device of the key receiver in some embodiments are node devices that respectively perform roles in distributing a key and receiving a key in the service data encryption method provided in some embodiments. A person skilled in the art easily understands that the same user not only can serve as a key distributor to distribute a derived key to another user, but also can server as a key receiver to receive a derived key distributed by another key distributor.

The node device of the key receiver executing the blockchain-based service data encryption method described in some embodiments may be a full node device that backs up all data content in a distributed database of the blockchain, or can be a light node device or a client device that backs up only a part of data content in the distributed database of the blockchain. This is not limited in the present specification.

The service data in some embodiments can be service-related data that can be consensually recorded in the distributed database by the blockchain. The blockchain can be used to back up service data generated in one or more service types. The service types can include a house renting service, a vehicle scheduling service, an insurance claim service, a credit service, a medical service, etc. Some node devices on the blockchain may not participate in operations of a certain service type. Therefore, to ensure security and privacy of service data related to the service type that is recorded in the distributed database of the blockchain, the service data related to the service type needs to be maintained privately from some node devices. Alternatively, even if some node devices on the blockchain participate in operations of a certain service type or some service types, service data uploaded by another participant to the blockchain for backup and storage still needs to be maintained private from the previous node devices for security and privacy consideration.

In view of the previous need for maintaining privacy of service data, as shown in FIG. 1, the blockchain-based service data encryption method provided in some embodiments includes the following steps.

Step 102: The node device of the key receiver obtains a first derived key distributed by the node device of the key distributor, where the first derived key is derived from a derived key of the key distributor based on a service data permission type of the key receiver, and the derived key can decrypt service data encrypted by the first derived key.

The service data permission type described in some embodiments is used to represent a user set type that has permission to access plaintext information of service data. For example, the blockchain can include a plurality of users participating in one service type or a plurality of users participating in a plurality of service types. Therefore, different service data can separately correspond to different user sets, and the different user sets have permission to access plaintext information of corresponding service data. For example, blockchain users A, B, and C have permission to access service data in a house renting service, blockchain users C, D, and E have permission to access service data in a car renting service, users A and B have permission to access service data in a house renting service in Beijing, and user C has permission to access service data in a house renting service in Shanghai. Corresponding service data permission types can be obtained through division for different user set types (such as user set types [A, B, C], [C, D, E], [A, B], and [C]) corresponding to the different service data.

The previous service data permission types can further include division of user sets having permission to access plaintext information of service data in a plurality of dimensions such as time, space, or an organization structure. For example, blockchain users A, B, and C have permission to access service data in a house renting service in 2018, and blockchain users C and D belonging to an organization structure of the Ministry of Justice have permission to access service data in a judgement document of the court. A person skilled in the art can set various service data permission types based on a specific mode for dividing or isolating specific services operated by the blockchain and related service data, which all fall within the protection scope of the present specification. In some embodiments, the use can obtain encrypted service data from the blockchain, and decrypt the encrypted service data based on a derived key received by the user, to determine the plaintext information of the service data.

The key distributor is a user that can generate a lower-level derived key (such as the first derived key in some embodiments) based on the service data permission type of the key receiver by using a derived key held by the user. The derived key of the key distributor can decrypt service data encrypted by any lower-level derived key derived from the derived key. The first derived key received by the key receiver can be derived from the derived key of the key distributor through first-level derivation, or can be derived from the derived key of the key distributor through multi-level derivation. This is not limited here.

It is worthwhile to node that the derived key of the key distributor in some embodiments can be a child derived key derived from a derived key of another key distributor and distributed by the another key distributor to the key distributor, or can be a root derived key held by the key distributor. This is not limited here. Regardless of whether the derived key of the key distributor is a child derived key or a root derived key, a lower-level derived key (such as the first derived key) can be further derived for key distribution.

Because the derived key of the key distributor can decrypt the service data encrypted by its lower-level derived key (such as the first derived key of the key receiver) of the derived key, the key distributor in some embodiments can serve as a superior monitoring institution or platform of the key receiver to monitor and manage encrypted service data sent by the key receiver. The key distributor distributes a corresponding first derived key to the key receiver based on the service data permission type of the key receiver. A plurality of key receivers corresponding to the same service data permission type can obtain the same first derived key, and a plurality of key receivers corresponding to different service data permission types obtain different first derived keys.

A specific method that the node device of the key receiver obtains the first derived key distributed by the node device of the key distributor can be as follows: The node device of the key receiver can obtain the first derived key from the blockchain by using the distributed database of the blockchain, or obtain the first derived key through point-to-point communication transmission by using an off-chain channel. Compared with the method of obtaining the first derived key through point-to-point communication transmission by using the off-chain channel, the method of obtaining the first derived key from the blockchain can ensure accuracy of the first derived key and prevent the first derived key from being tampered with, because the first derived key is recorded in the distributed database of the blockchain after consensus verification by nodes of the blockchain.

It is worthwhile to note that to prevent the first derived key from being obtained by another user from the blockchain, causing a risk to privacy security of the encrypted service data when the first derived key is obtained from the blockchain, all or some of the first derived keys described above can be encrypted by a user public key of a key receiver having permission (that is, corresponding service data permission) to obtain the first derived key. Therefore, the key receiver can determine the first derived key through decryption key based on a user private key.

Date encryption methods usually can be divided into symmetric encryption and asymmetric encryption. In some illustrated implementations, the derived key of the key distributor is a symmetric encryption key, and correspondingly, the first derived key derived from the derived key is also a symmetric encryption key. To be specific, the derived key or the first derived key can be used to encrypt service data, and can also be used to decrypt service data encrypted by the derived key or the first derived key. When the node device of the key receiver obtains the first derived key from the blockchain channel, the node device of the key receiver obtains an encrypted first derived key from the distributed database of the blockchain to ensure security and privacy of the first derived key. The first derived key is encrypted based on the user public key of the key receiver. Correspondingly, the node device of the key receiver decrypts the encrypted first derived key based on the user private key of the key receiver to obtain the first derived key.

In some illustrated implementations, the derived key of the key distributor is an asymmetric encryption key pair, that is, a public-private key pair. Correspondingly, a key derived from the derived key should also be an asymmetric encryption key pair. A pair of keys included in the first derived key are respectively a first derived public key and a first derived private key corresponding to the first derived public key. Because service data encrypted by the first derived public key needs to be decrypted by the first derived private key to obtain plaintext of the service data, a key receiver having a service data decryption need usually still needs to obtain the first derived private key corresponding to the first derived key. Similarly, the first derived private key can be obtained from the blockchain by using the distributed database of the blockchain, or obtained through point-to-point communication transmission by using an off-chain channel. Compared with the method of obtaining the first derived private key through point-to-point communication transmission by using the off-chain channel, the method of obtaining the first derived private key from the blockchain can ensure accuracy of the first derived private key and prevent the first derived private key from being tampered with, because the first derived private key is recorded in the distributed database of the blockchain after consensus verification by nodes of the blockchain.

Similarly, to prevent the first derived private key from being obtained by another user from the blockchain, causing a risk to privacy security of the encrypted service data when the first derived private key is obtained from the blockchain, the first derived private key can be encrypted by a user public key of a key receiver having permission to obtain the first derived key (that is, corresponding service data permission). Therefore, the key receiver can determine the first derived private key through decryption based on a user private key.

Optionally, that the key distributor sends the first derived private key encrypted by the user public key of the key receiver to the distributed database of the blockchain can be enabled based on a request of the key receiver. The key receiver should send a request transaction for the first derived private key to the blockchain. The request transaction is encrypted by the user private key of the key receiver, so that the node device of the key distributor sends the first derived private key encrypted by the user public key of the key receiver to the blockchain after verification on the request transaction based on the user public key of the key receiver succeeds. The verification on the request transaction can include identity verification on the key receiver, verification on whether the service data permission type corresponding to the key receiver corresponds to the first derived private key, etc.

In some embodiments, because the first derived public key can be made known to any user as a public key, the key distributor can publish the first derived key to the distributed database of the blockchain in a plaintext form, so that the key receiver can directly obtain the first derived key. Certainly, the first derived key and the first derived private key corresponding to the first derived key can be published in the same transaction sent by the key distributor, or can be published in different transactions sent by the key distributor. This is not limited here.

It is worthwhile to note that the two keys (the first derived public key and the first derived private key) included in the first derived key in some embodiments both are derived from the derived key of the key distributor through calculation. Therefore, any key in the first derived key can be selected as the first derived public key, and the other key selected as the first derived private key.

Advantageously, a blockchain system can set identifiers for different service data permission types. To help users of the same service data permission type on the blockchain to decrypt or encrypt corresponding service data by using the first derived key of the key distributor, the key receiver in some embodiments can store a mapping relationship between the first derived key and the identifier of the service data permission type of the user in a local database after receiving the first derived key, so as to help the user query and use the first derived key.

The process of deriving the first derived key from the derived key in the previous embodiment can be obtained through calculation based on a related key derivation function. In some illustrated implementations, the first derived key is a key derived from the derived key of the key distributor through Key Derivation Function calculation based on a service data access permission type of the key receiver.

A person skilled in the art should know that a key tree can be randomly generated by using key derivation function (KDF). Only one root key needs to be stored, and a specific derived key of a node at each level can be calculated and derived in real time based on a derivation path. The derived key of the node at each level in the key tree can be derived from a derived key of a parent node of the node, and a child node is not capable of calculating a derived key of its parent node. The embodiments provided in the present specification do not limit a specific derivation level (at least first-level derivation) that the first derived key is derived from the derived key of the key distributor based on the service data permission type of the key receiver. Therefore, the derived key of the key distributor in the embodiments of the present specification can be either a root key of the KDF key tree or a derived key of any non-leaf node of the KDF key tree. Because a blockchain user can have a plurality of different service data permission types in specific service processing, derived keys or derived public-private key pairs corresponding to different service data permission types can be correspondingly configured at different nodes in the KDF key tree.

Figure 2:
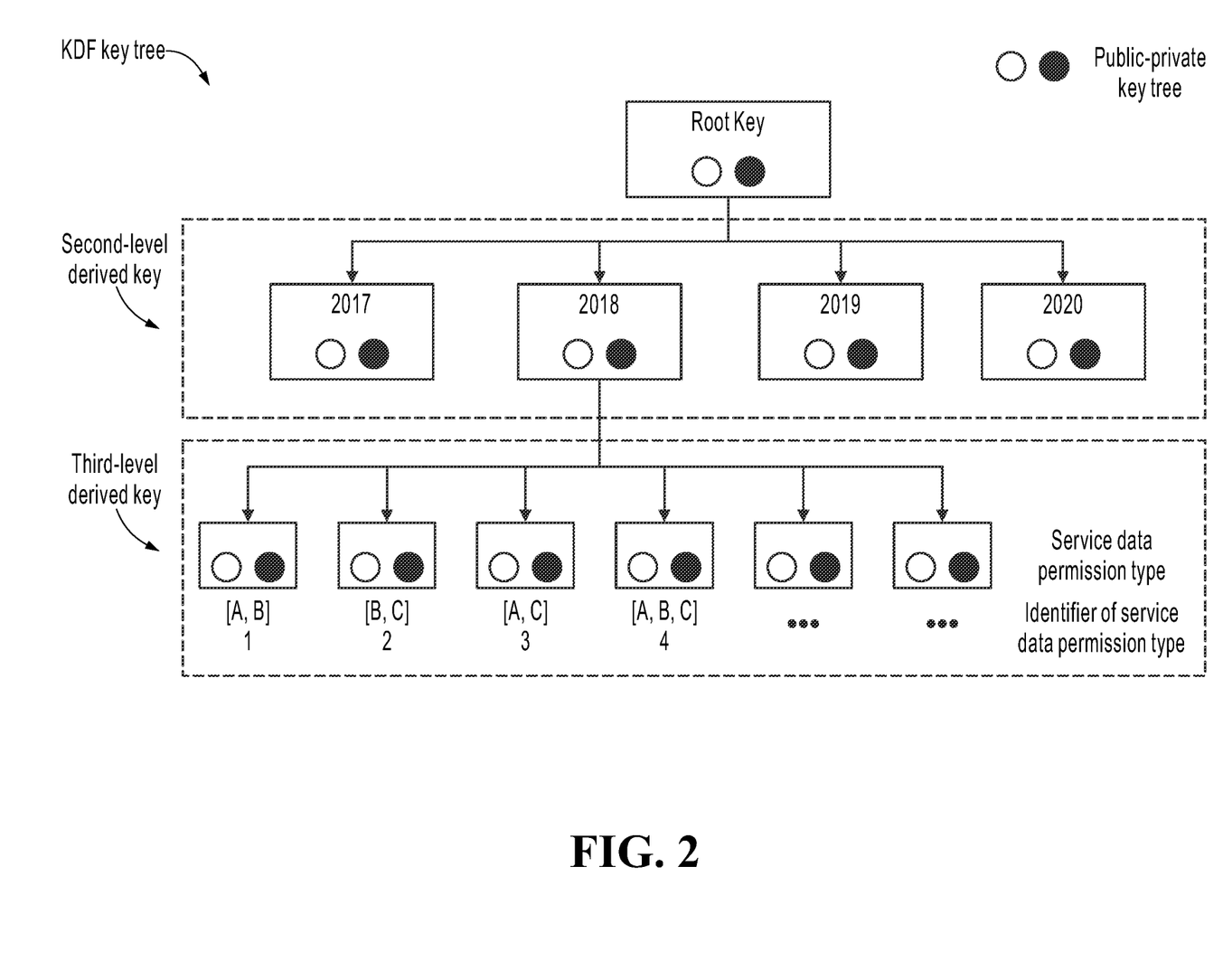
FIG. 2 is a schematic diagram illustrating a key derivation structure, according to an example embodiment.
Figure 3:
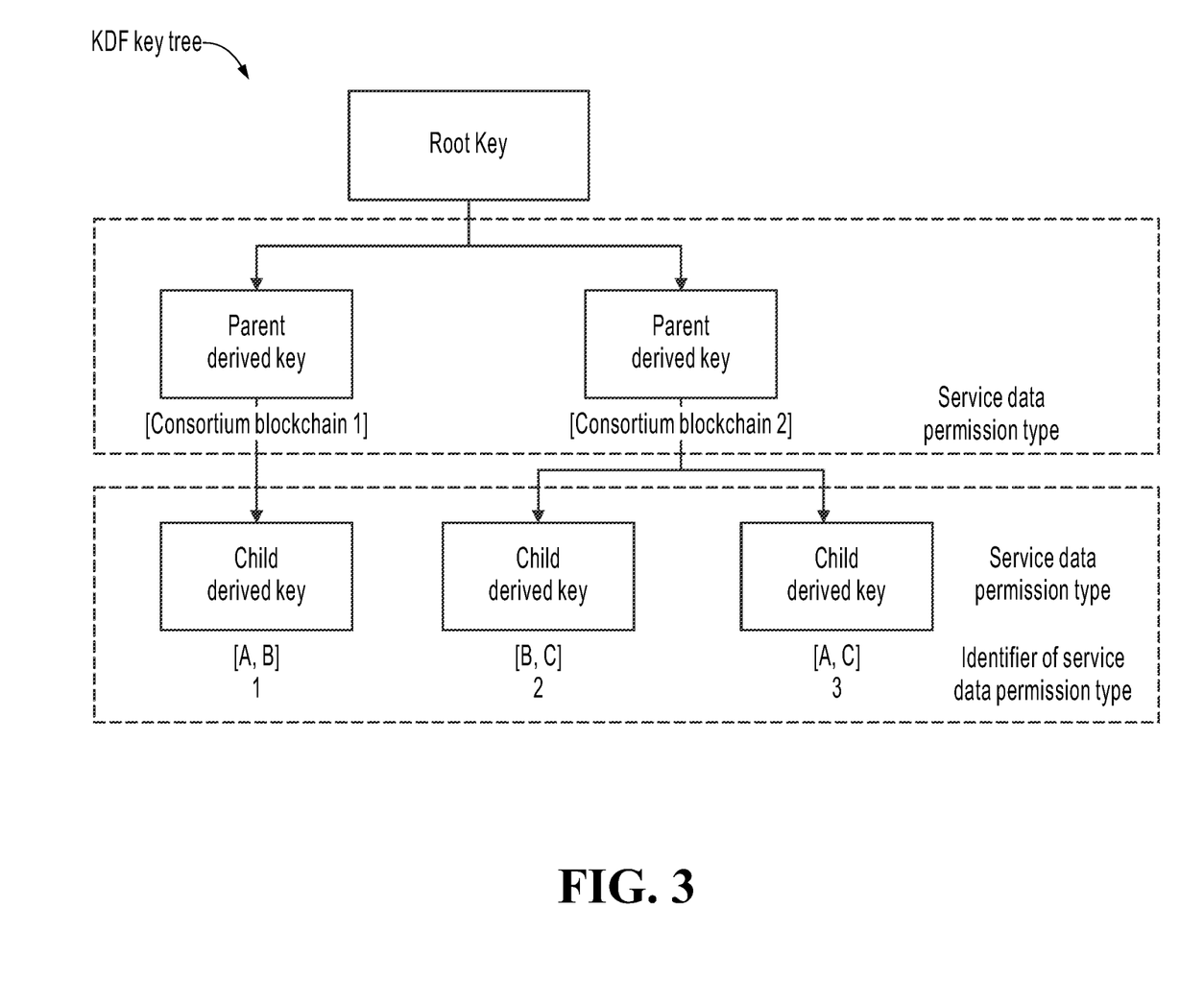
FIG. 3 is a schematic diagram illustrating a key derivation structure, according to another example embodiment.

FIG. 2 and FIG. 3 are respectively schematic diagrams of a KDF key tree derivation structure in a specific service mode. A root key of the KDF key tree shown in FIG. 2 is a public-private key pair, and a derived key of any node derived from the root key is a public-private key pair. A parent node in the KDF key tree can derive any child node through deduction. Therefore, the parent node can decrypt service data encrypted by any child node, and a blockchain user obtaining a derived key of the parent node can decrypt and monitor service data encrypted by a blockchain user obtaining a derived key of the child node.

To ensure security of the derived key, the key distributor can periodically update the derived key. In the KDF key tree structure shown in FIG. 2, a key distributor obtaining the root node key derives different derived keys for service data in different years, for example, in 2017, 2018, 2019, and 2020. A corresponding service data permission type corresponds to each of the years. Derived keys in the previous different years can be backed up in the blockchain, for example, the derived key is encrypted by a user public key of a key distributor that can obtain the corresponding year and is backed up in the distributed database of the blockchain, so as to assist the key distributor in querying historical service data. It is worthwhile to note that, blockchain users obtaining derived keys (second-level derived keys) in different years in FIG. 2 serve as key receivers, and can be key distributors holding the root node key, or can be other blockchain users that the key distributor holding the root node key distributes a key based on the service data permission type.

Different leaf nodes in the KDF key tree structure shown in FIG. 2 correspond to different service data permission types, and blockchain users of the same service data permission type can share a public-private key pair corresponding to the leaf node. A person skilled in the art should know that a third-level derived key (which is a leaf node in this case) shown in FIG. 2 can be further used for downward derivation (not shown in the figure). A user having corresponding service data permission serves as a key distributor to perform further data privacy isolation management for service data monitored by the user. To be specific, the third-level derived key is used as a parent derived key, and a blockchain user (serving as a key distributor) holding the third-level derived key performs lower-level key derivation based on different service data permission types of service data (that is, service data monitored by the blockchain user) of the blockchain user that can be made known to by another blockchain user.

FIG. 3 shows a KDF key derivation structure that a plurality of blockchains share a root node. Derived keys in different blockchains can be derived from the same root node key. The key derivation structure is particularly applicable to a multi-blockchain system including a plurality of consortium blockchains based on a plurality of service types, for example, blockchain 1 is a consortium blockchain operating a house renting service, and blockchain 2 is a consortium blockchain operating a shared car renting service. The multi-blockchain system can have a unified key distributor to hold the root node key, and the key distributor can be a general monitoring institution (such as a government administration) of the multi-blockchain system or a construction institution of the multi-blockchain system.

The same key receiver may have different service data permission types. As shown in FIG. 3, blockchain user A has both a service data permission type in consortium blockchain 1 and a service data permission type in consortium blockchain 2, and blockchain user B has two service data permission types in consortium blockchain 2. To help blockchain user A or B serving as the key receiver encrypt corresponding service data without confusing the derived key (that is, the first derived key described in the previous embodiments) that should be used by blockchain user A or B, the node device of the key receiver can store, in a local database, a table of a mapping relationship between the first derived key and the service data permission type corresponding to the first derived key.

It is worthwhile to note that in the KDF key tree, a seed usually can be used to assist in derivation in a process of generating a child node (corresponding to a key receiver) by a parent node (corresponding to a key distributor), and a specific seed is defined by the key distributor to assist the key distributor in deriving a child node through calculation. Some words that are easy to remember usually can be selected as the seeds, so that the key distributor manages a plurality of derived keys generated based on various service data permission types, and when any derived key except the root key is lost, the key distributor holding the root key can regenerate or restore the derived key at each level based on the seeds. For example, a seed word in an example of/source tracing industry blockchain/2018/ABC/can be selected for a KDF key tree constructed in a rule of/consortium blockchain identifier/time (year)/service type/. To be specific, a name of the consortium blockchain is "source tracing industry blockchain", the derived key is used in 2018, and the service data permission type is visible to consortium participants A, B, and C.

Step 104: Encrypt service data based on the first derived key to obtain encrypted service data.

There can be a plurality of specific methods for encrypting the service data in some embodiments. For example, when the first derived key is a symmetric encryption key, the first derived key can be used to encrypt the service data to obtain first encrypted service data. The encrypted service data includes the first encrypted service data. Blockchain users of the same service data permission type can obtain the first derived key by using the method for obtaining the first derived key described in the one or more embodiments, and decrypt the encrypted service data obtained from the distributed database of the blockchain to obtain plaintext information of the service data.

For another example, when the first derived key is an asymmetric key (pair), the first derived public key can be used to encrypt the service data to obtain first encrypted service data. The encrypted service data includes the first encrypted service data. Because data encrypted by the first derived public key needs to be decrypted by using the first derived private key, blockchain users of the same service data permission type can obtain the first derived private key corresponding to the first derived key by using the method for obtaining the first derived private key described in the one or more embodiments, and decrypt the encrypted service data obtained from the distributed database of the blockchain based on the first derived private key, to obtain plaintext information of the service data.

The encrypting the service data by using the first derived key or the first derived public key described in the previous two implementations can include encrypting all service data in a transaction or encrypting some service data in a transaction, and can include directly encrypting the service data or encrypting ciphertext of the service data.

In addition to using the first derived key or the first derived public key to encrypt all or some of the service data to generate the encrypted service data described in the previous implementations, the first derived key or the first derived public key can be used to encrypt a decryption key corresponding to ciphertext of all or some of the service data to generate encrypted service data. For example, when the first derived key is a symmetric encryption key, the key receiver holding the first derived key can first encrypt the service data by using a third encryption key to obtain second encrypted service data, and then encrypt a third decryption key corresponding to the third encryption key by using the first derived key to obtain third encryption key data. The encrypted service data sent to the blockchain should include the second encrypted service data and the third encrypted service data. A person skilled in the art easily knows that the method for performing encryption by using the third encryption key can be symmetric encryption or asymmetric encryption. When the third encryption key is a key used in the symmetric encryption method, the third decryption key is the same as the third encryption key. When the third encryption key is a key used in the asymmetric encryption method, the third decryption key is a private key or a public key corresponding to the third encryption key.

For example, when the first derived key is an asymmetric encryption key (pair), the key receiver holding the first derived key can first encrypt the service data by using a third encryption key to obtain second encrypted service data, and then encrypt a third decryption key corresponding to the third encryption key by using the first derived public key to obtain third encryption key data. The encrypted service data sent to the blockchain should include the second encrypted service data and the third encrypted service data. Because data encrypted by the first derived public key needs to be decrypted by using the first derived private key, blockchain users of the same service data permission type can obtain the first derived private key corresponding to the first derived key by using the method for obtaining the first derived private key described in the one or more embodiments, and sequentially decrypt the third encrypted service data and the second encrypted service data obtained from the distributed database of the blockchain based on the first derived private key, to obtain plaintext information of the service data. A person skilled in the art easily knows that the method for performing encryption by using the third encryption key can be symmetric encryption or asymmetric encryption. When the third encryption key is a key used in the symmetric encryption method, the third decryption key is the same as the third encryption key. When the third encryption key is a key used in the asymmetric encryption method, the third decryption key is a private key or a public key corresponding to the third encryption key.

Step 106: Send the encrypted service data to the blockchain, so that the encrypted service data is recorded in a distributed database of the blockchain after the blockchain performs consensus verification on the encrypted service data.

In some illustrated implementations, a specific process of recording the encrypted service data in the distributed database of the blockchain can include the following steps:

A consensus bookkeeping node satisfying a consensus algorithm of the blockchain is determined.

The consensus bookkeeping node adds the encrypted service data to a candidate block.

The consensus bookkeeping node broadcasts the candidate block to a node of the blockchain.

After the candidate block is verified and approved by a predetermined quantity of nodes on the blockchain, the candidate block is considered as the latest block and added to the distributed database of the blockchain.

The consensus algorithm can include the proof of work mechanism PoW), the proof of stake mechanism (PoS), a delegated proof of stake mechanism (DPoS), etc. To shorten a confirmation time of a transaction or data, increase a transaction throughput, and satisfy security and performance needs, and in particular, to construct a blockchain including different node users based on different service types, a consortium blockchain architecture can be selected to construct the blockchain in the embodiments of the present specification. The consortium blockchain usually uses a consensus algorithm such as proof of rights, PBFT, RAFT, etc., because consensus efficiency of using the algorithm is high, needs of a high-frequency transaction volume can be satisfied, a consensus delay is low, and the encrypted service data can be quickly recorded in a new block of the blockchain. In addition, a trusted node in the consortium blockchain network is used as a preselected bookkeeping node to consider security and stability. More, the PBFT algorithm does not consume too much computing power resources of a computer, and unnecessarily need currency circulation. Therefore, the PBFT algorithm is good for use.

To help users of the same service data permission type on the blockchain decrypt the encrypted service data provided in the previous plurality of embodiments, a service data permission type identifier corresponding to the first derived key can be sent to the distributed database of the blockchain together with the encrypted service data. After obtaining the service data permission type identifier, the blockchain user can query, in the local database, a decryption key (the first derived key or the first derived private key) corresponding to the service data permission type identifier, so as to conveniently and quickly decrypt the encrypted service data.

In the blockchain-based data encryption method described in the one or more embodiments, the key distributor distributes a key to the key receiver based on a service data permission type. Because a derived key of the key distributor can decrypt a derived key of any level derived from the derived key, the key distributor can monitor and manage service data of the key receiver corresponding to the key distributor. The key distributor can also serve as a key receiver of another higher-level key distributor, that is, the derived key of the key distributor is derived from a derived key of the another higher-level key distributor. Therefore, a corresponding derived key tree can be established based on a user service relationship (for example, a monitoring-monitored relationship, a data sharing relationship, and a data isolation relationship, etc.) involved in a service operated by the blockchain, thereby not only ensuring that the service data is isolated between users of different service data permission types, but also ensuring that the service data can be monitored by users of a higher-level service data permission type; not only ensuring security and privacy of service data, but also ensuring monitorability of the service data.

Figure 5:
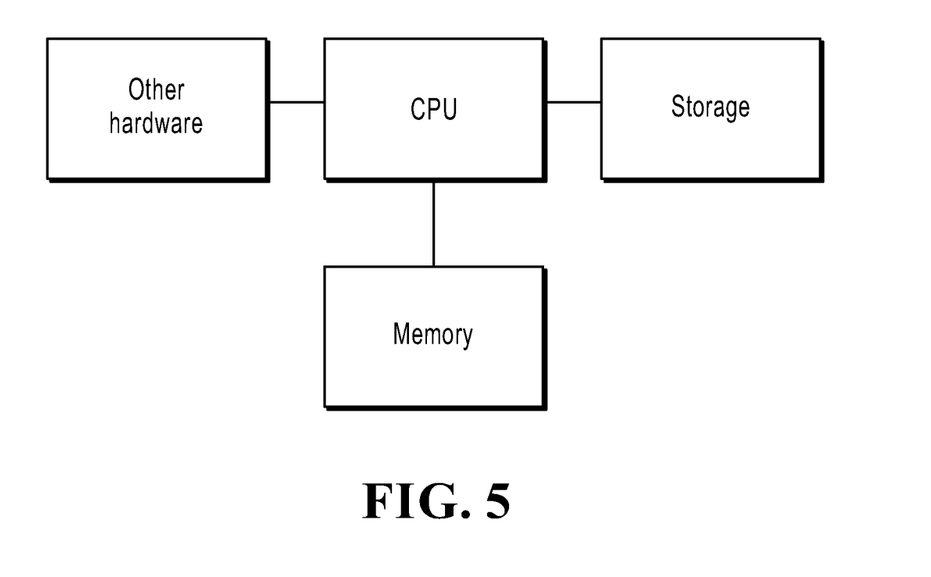
FIG. 5 is a diagram illustrating a hardware structure running the blockchain-based service data encryption apparatus provided in the embodiments of the present specification.

Corresponding to previous process implementation, the embodiments of the present specification further provide blockchain-based service data encryption apparatuses. The apparatus can be implemented by using software, or can be implemented by using hardware or a combination of software and hardware. A software implementation is used as an example. As a logical apparatus, a corresponding computer program instruction is read into a memory for running by using a central processing unit (CPU) of a device the apparatus is in. In terms of hardware, in addition to the CPU, the memory, and the storage shown in FIG. 5, a device that a network risk service implementation apparatus is in usually further includes other hardware such as a chip used to receive and send a wireless signal, and/or other hardware such as a board used to implement a network communication function.

Figure 4:
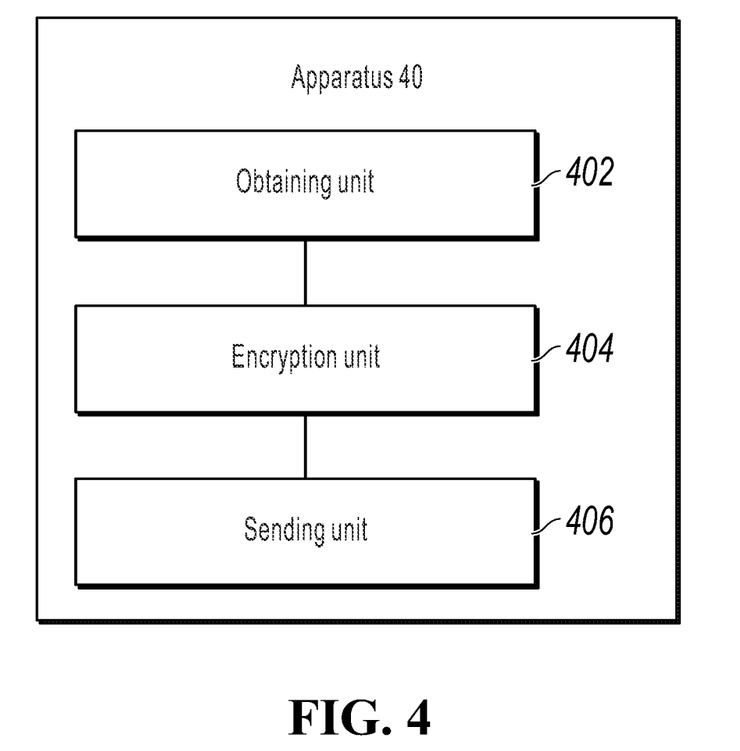
FIG. 4 is a schematic diagram illustrating a blockchain-based service data encryption apparatus, according to an example embodiment.

FIG. 4 shows a blockchain-based service data encryption apparatus 40, applied to a blockchain including a node device of a key distributor and a node device of a key receiver, including:

An obtaining unit 402, configured to obtain, by the node device of the key receiver, a first derived key distributed by the node device of the key distributor, where the first derived key is derived from a derived key of the key distributor based on a service data permission type of the key receiver, and the derived key can decrypt service data encrypted by the first derived key.

An encryption unit 404, configured to encrypt service data based on the first derived key to obtain encrypted service data A sending unit 406, configured to send the encrypted service data to the blockchain, so that the encrypted service data is recorded in a distributed database of the blockchain after the blockchain performs consensus verification on the encrypted service data.

In another illustrated implementation, both the derived key of the key distributor and the first derived key of the key receiver are symmetric encryption keys, and the obtaining unit 402 is configured to obtain, by the node device of the key receiver, an encrypted first derived key from the distributed database of the blockchain, where the first derived key is encrypted based on a user public key of the key receiver. The obtaining unit 402 is further configured to decrypt the encrypted first derived key based on the user private key of the key receiver to obtain the first derived key.

In another illustrated implementation, both the derived key of the key distributor and the first derived key of the key receiver are asymmetric encryption key pairs, and the first derived key includes a first derived public key and a first derived private key; and the obtaining unit 402 is configured to obtain the first derived public key and the first derived private key encrypted by the user public key of the key receiver from the distributed database of the blockchain.

In another illustrated implementation, the sending unit 406 is configured to send a request transaction for the first derived private key to the blockchain, where the request transaction is encrypted by the user private key of the key receiver, so that the node device of the key distributor sends the first derived private key encrypted by the user public key of the key receiver to the blockchain after successfully verifying the request transaction based on the user public key of the key receiver.

In another illustrated implementation, the first derived key is a key derived from the derived key of the key distributor through KDF calculation based on a service data access permission type of the key receiver.

In another illustrated implementation, the encryption unit 404 is configured to encrypt the service data by using the first derived key to obtain first encrypted service data.

The encrypted service data includes the first encrypted service data.

In another illustrated implementation, the encryption unit 404 is configured to encrypt the service data by using the first derived public key to obtain first encrypted service data.

The encrypted service data includes the first encrypted service data.

In another illustrated implementation, the encryption unit 404 is configured to encrypt the service data by using a third encrypted key to obtain second encrypted service data, and encrypt a third decryption key corresponding to the third encryption key by using the first derived key to obtain third encrypted key data.

The encrypted service data includes the second encrypted service data and the third encrypted key data.

In another illustrated implementation, the encryption unit 404 is configured to encrypt the service data by using a third encrypted key to obtain second encrypted service data, and encrypt a third decryption key corresponding to the third encryption key by using the first derived public key to obtain third encrypted key data.

The encrypted service data includes the second encrypted service data and the third encrypted key data.

In another shown implementation, the apparatus 40 further includes a storage unit 408, configured to store the first derived key and an identifier of the service data permission type in a local database of the key receiver.

In another illustrated implementation, the sending unit 406 is configured to send the encrypted service data and the identifier of the service data permission type to the blockchain.

For an implementation process of functions and roles of each unit and module in the apparatus, references can be made to an implementation process of corresponding steps in the previous method. For related parts, reference can be made to partial descriptions in the method embodiments. Details are omitted here for simplicity.

The system, apparatus, module, or unit illustrated in the previous embodiments can be implemented by using a computer chip or an entity, or can be implemented by using a product having a certain function. A typical implementation device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

Corresponding to the previous method embodiments, the embodiments of the present specification further provide a computer device, and the computer device includes a memory and a processor. The memory stores a computer program that can be run by the processor. The processor performs steps of the blockchain-based data encryption method in the embodiments of the present specification when running the stored computer program. For detailed descriptions of the steps of the blockchain-based data encryption method, reference can be made to the previous content. Details are not described here.

The previous descriptions are merely preferred embodiments of the present specification, but are not intended to limit the present specification. Any modification, equivalent replacement, or improvement made without departing from the spirit and principle of the present specification shall fall within the protection scope of the present specification.

In a typical configuration, a computing device includes one or more processors (CPU), an input/output interface, a network interface, and a memory.

The memory can include a non-persistent memory, a random access memory (RAM), a non-volatile memory, and/or another form that are in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data.

Examples of the computer storage medium include but are not limited to a phase change random access memory (PRAM), a static random access memory (SRAM), a dynamic random access memory (DRAM), a random access memory of another type, a read-only memory (ROM), an electrically erasable programmable read-only memory (EEPROM), a flash memory or another memory technology, a compact disc read-only memory (CD-ROM), a digital versatile disc (DVD) or another optical storage, a cassette, a cassette magnetic disk storage or another magnetic storage device, or any other non-transmission medium. The computer storage medium can be configured to store information that can be accessed by a computing device. As described in the present application, the computer readable medium does not include computer readable transitory media such as a modulated data signal and a carrier.

It is worthwhile to further note that, the terms "include", "contain", or their any other variants are intended to cover a non-exclusive inclusion, so that a process, a method, a product, or a device that includes a list of elements not only includes those elements but also includes other elements not expressly listed, or further includes elements inherent to such process, method, product or device. Without more constraints, an element preceded by "includes a . . . " does not preclude the existence of additional identical elements in the process, method, product or device that includes the element.

A person skilled in the art should understand that embodiments of the present specification can be provided as a method, a system, or a computer program product. Therefore, the implementations of the present specification can use a form of hardware only implementations, software only implementations, or implementations with a combination of software and hardware. Moreover, the implementations of the present specification can use a form of a computer program product that is implemented on one or more computer-usable storage media (including but not limited to a disk memory, a CD-ROM, an optical memory, etc.) that include computer-usable program code.

What is claimed is:

1. A computer-implemented method, comprising:
   obtaining, by a node device of a key receiver, a first derived key that is distributed by a node device of a key distributor, wherein the first derived key is derived from a derived key of the key distributor based on a service data permission type of the key receiver, wherein the first derived key is a symmetric encryption key, and wherein obtaining the first derived key comprises obtaining, by the node device of the key receiver, the first derived key encrypted by a user public key of the key receiver from a distributed database of a blockchain;
   encrypting service data based on the first derived key to obtain encrypted service data, comprising:
      encrypting the service data by using the first derived key to obtain first encrypted service data, wherein the encrypted service data comprises the first encrypted service data,
      encrypting the service data by using an encryption key to obtain second encrypted service data, and
      encrypting a decryption key corresponding to the encryption key by using the first derived key to obtain encrypted key data, wherein the encrypted service data comprises the second encrypted service data and the encrypted key data; and
   sending the encrypted service data to the blockchain, wherein the encrypted service data is recorded in the distributed database of the blockchain after the blockchain performs consensus verification on the encrypted service data.

2. The computer-implemented method of claim 1, further comprising:
   sending a request transaction for the first derived key to the blockchain; and
   performing an identity verification of the key receiver.

3. The computer-implemented method of claim 1, wherein the first derived key is a key derived from the derived key of the key distributor through key derivation function (KDF) calculation based on a service data access permission type of the key receiver.

4. The computer-implemented method of claim 1, wherein encrypting the service data based on the first derived key to obtain the encrypted service data comprises:
   encrypting a ciphertext of the service data.

5. The computer-implemented method of claim 1, further comprising:
   storing the first derived key and an identifier of the service data permission type in a local database of the key receiver.

6. The method of claim 5, wherein sending the encrypted service data to the blockchain comprises:
   sending the encrypted service data and the identifier of the service data permission type to the blockchain.

7. A non-transitory, computer-readable medium storing one or more instructions executable by a computer system to perform operations comprising:

obtaining, by a node device of a key receiver, a first derived key that is distributed by a node device of a key distributor, wherein the first derived key is derived from a derived key of the key distributor based on a service data permission type of the key receiver, wherein the first derived key is a symmetric encryption key, and wherein obtaining the first derived key comprises obtaining, by the node device of the key receiver, the first derived key encrypted by a user public key of the key receiver from a distributed database of a blockchain;

encrypting service data based on the first derived key to obtain encrypted service data, comprising:
encrypting the service data by using the first derived key to obtain first encrypted service data, wherein the encrypted service data comprises the first encrypted service data,
encrypting the service data by using an encryption key to obtain second encrypted service data, and
encrypting a decryption key corresponding to the encryption key by using the first derived key to obtain encrypted key data, wherein the encrypted service data comprises the second encrypted service data and the encrypted key data; and sending the encrypted service data to the blockchain, wherein the encrypted service data is recorded in the distributed database of the blockchain after the blockchain performs consensus verification on the encrypted service data.

8. The non-transitory, computer-readable medium of claim 7, further comprising:
sending a request transaction for the first derived key to the blockchain; and
performing an identity verification of the key receiver.

9. The non-transitory, computer-readable medium of claim 7, wherein the first derived key is a key derived from the derived key of the key distributor through key derivation function (KDF) calculation based on a service data access permission type of the key receiver.

10. The non-transitory, computer-readable medium of claim 7, the operations further comprising:
storing the first derived key and an identifier of the service data permission type in a local database of the key receiver.

11. The non-transitory, computer-readable medium of claim 10, wherein sending the encrypted service data to the blockchain comprises:
sending the encrypted service data and the identifier of the service data permission type to the blockchain.

12. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
obtaining, by a node device of a key receiver, a first derived key that is distributed by a node device of a key distributor, wherein the first derived key is derived from a derived key of the key distributor based on a service data permission type of the key receiver, wherein the first derived key is a symmetric encryption key, and wherein obtaining the first derived key comprises obtaining, by the node device of the key receiver, the first derived key encrypted by a user public key of the key receiver from a distributed database of a blockchain, encrypting service data based on the first derived key to obtain encrypted service data, comprising:
encrypting the service data by using the first derived key to obtain first encrypted service data, wherein the encrypted service data comprises the first encrypted service data,
encrypting the service data by using an encryption key to obtain second encrypted service data, and
encrypting a decryption key corresponding to the encryption key by using the first derived key to obtain encrypted key data, wherein the encrypted service data comprises the second encrypted service data and the encrypted key data, and sending the encrypted service data to the blockchain, wherein the encrypted service data is recorded in the distributed database of the blockchain after the blockchain performs consensus verification on the encrypted service data.

13. The computer-implemented system of claim 12, wherein the one or more operations further comprise:
sending a request transaction for the first derived key to the blockchain; and
performing an identity verification of the key receiver.

14. The computer-implemented system of claim 12, wherein the first derived key is a key derived from the derived key of the key distributor through key derivation function (KDF) calculation based on a service data access permission type of the key receiver.

15. The computer-implemented system of claim 12, wherein the one or more operations further comprise:
storing the first derived key and an identifier of the service data permission type in a local database of the key receiver.

16. The computer-implemented system of claim 15, wherein sending the encrypted service data to the blockchain comprises: sending the encrypted service data and the identifier of the service data permission type to the blockchain.

* * * * *